United States Patent [19]
van Raalte

[11] Patent Number: 4,574,306
[45] Date of Patent: Mar. 4, 1986

[54] APPARATUS AND METHOD FOR AUTOMATICALLY MEASURING THE SHOE-LENGTH OF A VIDEO DISC STYLUS

[75] Inventor: John A. van Raalte, Princeton, N.J.

[73] Assignee: RCA Corporation, Princeton, N.J.

[21] Appl. No.: 574,462

[22] Filed: Jan. 27, 1984

[51] Int. Cl.⁴ .............................................. H04N 7/18
[52] U.S. Cl. .................................... 358/107; 358/101
[58] Field of Search ................. 358/107, 106, 93, 139, 358/101, 113; 356/380, 387, 383, 384; 250/222.1, 224

[56] References Cited

U.S. PATENT DOCUMENTS

| | | | |
|---|---|---|---|
| 3,216,311 | 11/1965 | Bibbero et al. | 358/107 X |
| 3,321,575 | 5/1967 | Lewczyk | 358/107 X |
| 3,798,366 | 3/1974 | Hunt et al. | 358/113 X |
| 3,812,288 | 5/1974 | Walsh et al. | 358/93 X |
| 3,842,194 | 10/1974 | Clemens | 358/342 X |
| 3,963,866 | 6/1976 | Tanie | 178/7.2 |
| 4,176,376 | 11/1979 | Kamachi et al. | 358/107 |
| 4,236,178 | 11/1980 | Tiemeijer | 358/93 |
| 4,296,371 | 10/1981 | Keizer et al. | 324/61 R |
| 4,305,096 | 12/1981 | Yokoshima et al. | 358/101 |
| 4,363,050 | 12/1982 | Modla | 360/32 |
| 4,393,401 | 6/1983 | Gorenflo et al. | 358/107 |

FOREIGN PATENT DOCUMENTS 33-6854 8/1958 Japan .

Primary Examiner—Howard W. Britton
Assistant Examiner—Victor R. Kostak
Attorney, Agent, or Firm—Birgit E. Morris; Donald S. Cohen; James M. Trygg

[57] ABSTRACT

An apparatus and method is shown for measuring the shoe length of a video disc stylus and displaying a digital representation of the measured value in standard units of length for viewing by a human observer. The apparatus utilizes a video slicer for providing a selectively positionable sampling line on the screen of a monitor which displays an image of the part to be measured. The sampling line is positioned directly over the part to be measured and a signal is generated having a pulse amplitude corresponding to the brightness of the image only along the sampling line, and having a pulse width corresponding to the length of the image along the sampling line.

9 Claims, 3 Drawing Figures

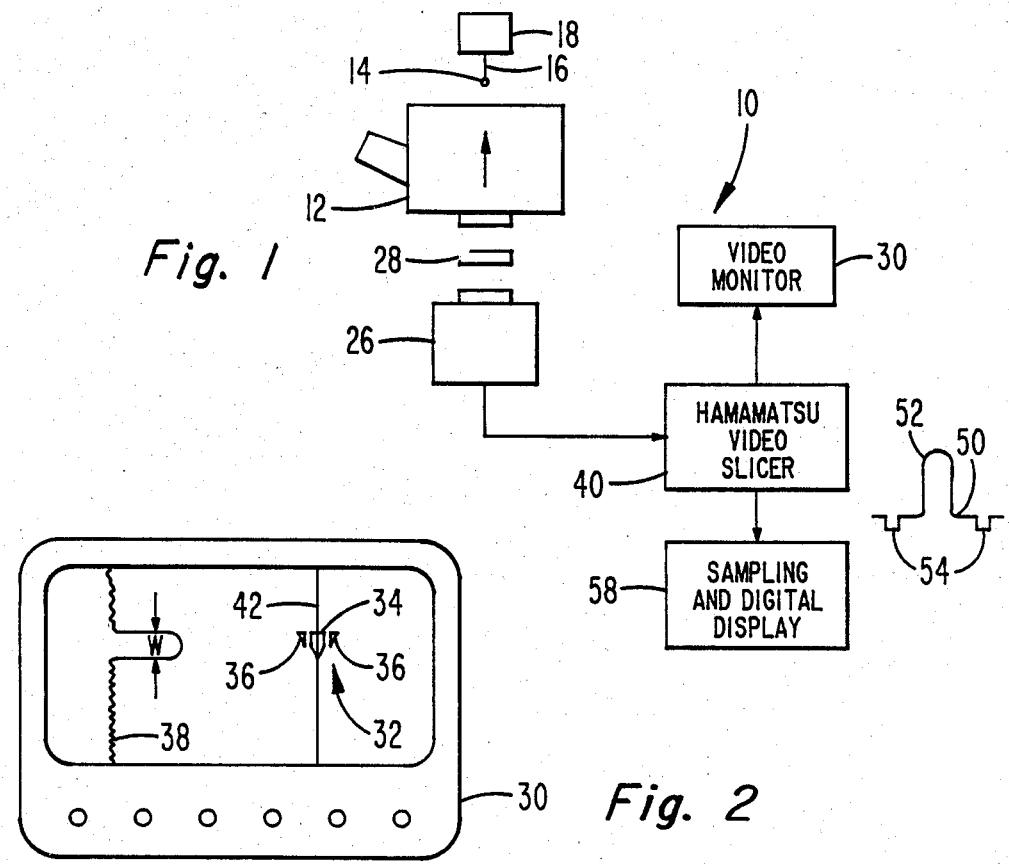
Fig. 1
Fig. 2
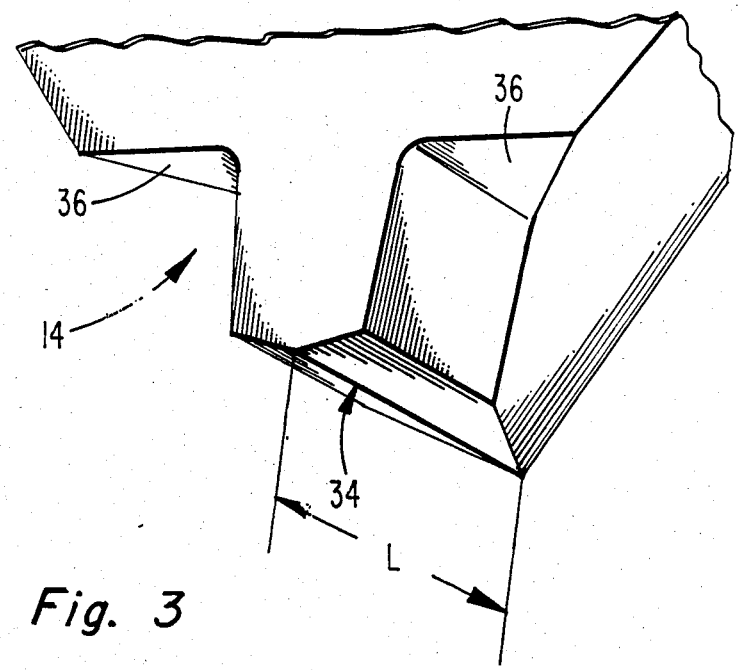
Fig. 3

APPARATUS AND METHOD FOR AUTOMATICALLY MEASURING THE SHOE-LENGTH OF A VIDEO DISC STYLUS

This invention relates to apparatus for measuring small parts having microscopic dimensions and more particularly to apparatus for automatically measuring the length of the shoe of a video disc stylus.

BACKGROUND OF THE INVENTION

Audio and video disc playback systems of the type using a disc having recorded information signals encoded into a fine spiral groove typically utilize a stylus to read the encoded information signals. Included in such systems are the capacitive playback systems, wherein the stylus dielectric material is coated on at least one surface with a conductive metal layer which interacts with the conductive disc to read the information encoded thereon. An example of such a system is disclosed in U.S. Pat. No. 3,842,194 issued Oct. 15, 1974 to Clemens. Clemens discloses a video disc having a playback system utilizing variable capacitance. In one configuration of the Clemens system, information representative of recorded picture and sound is encoded in the form of a relief pattern in a relatively fine spiral groove on the surface of a disc. For example, groove widths of about 2.5 micrometers and groove depths of about 1.0 micrometer may be used. During playback a pickup stylus having a shoe width of 2.0 micrometers and a thin conductive electrode formed thereon, for example about 0.2 micrometer thick, engages the groove as the record is rotated by a supportive turntable. Capacitive variations between the stylus electrode and the disc surface are sensed to recover the prerecorded information. In systems of the above type, the use of a relatively fine record groove and the requirements for a groove engaging pickup stylus result in a stylus tip which is extremely small. Further, the length of the stylus shoe is critical because if it is too short the stylus may damage the disc due to excessive pressure. If the stylus shoe is too long, on the other hand, stylus life is reduced and electrical performance is degraded.

During the manufacturing of such styli frequent inspection of the tip is therefore necessary. This inspection is usually done by examination through a high power optical microscope having, for example 1000× to 1500× magnification. The stylus tip is centered in the field of view of the microscope by an operator and the shoe of the stylus is visually compared to a reticle. The length of the shoe is estimated and a determination made as to the need for further lapping of the stylus shoe. The present lapping process used in the industry produces somewhat inconsistent results from one stylus to another. Since excessive lapping results in a defective stylus, frequent and accurate measuring of the shoe length is essential.

In a mass production environment a system that requires an operator to look into a microscope and make a dimensional measurement near the resolution limit of the microscope is unattractive for many reasons. Operator fatigue is likely to occur and occasionally an erroneous measurement will be made.

What is needed is an apparatus that is easily and quickly manipulated by a relatively unskilled operator to automatically make the desired measurement.

SUMMARY OF THE INVENTION

According to the present invention there is shown an apparatus for automatically measuring the length of a body having microscopic dimensions. An optical microscope is focused on the body and forms an optical image thereof. A video camera is coupled to the microscope and is arranged to form first video signals representative of the optical image. A video slicer means is provided which, in response to the first video signals, generates second video signals representative of the brightness of the optical image along a particular sampling line. A sampling and display means, responsive to the second video signal, automatically determines a value which is representative of the length of the body and displays this value in standard units of length.

BRIEF DESCRIPTION OF THE DRAWINGS

FIG. 1. is a block diagram of a stylus point viewing and measuring system having an apparatus for measuring and displaying the shoe length of a video disc stylus utilizing the teachings of the present invention;

FIG. 2. is a representative view of the video monitor shown in FIG. 1; and

FIG. 3. is a schematic representation of a video disc stylus point.

DESCRIPTION OF THE PREFERRED EMBODIMENT

With reference to FIGS. 1 and 2 there is shown a system block diagram depicting apparatus 10 for automatically measuring the length of the shoe of a video disc stylus. The apparatus 10 includes a microscope 12 having a 1000× magnification arranged to focus on the point 14 of a stylus 16 which is held in operating position within a stylus holder 18 and generates an optical image of the point. A standard industrial TV camera 26, such as a one-inch RCA Nuvicon Camera (type N-1005), is positioned at a fixed distance from the microscope so that the camera 26 may focus on the image of the stylus point 14 through the optics of the microscope 12. The output of the camera 26 is displayed on a TV monitor 30. Magnification of the image received by the camera 26 may be increased to 3000× or even 5000× by simply inserting another lens 28 of the appropriate focal length at a point approximately two inches from the Nuvicon tube. In this way the size of the image displayed on the monitor 30, may be adjusted for comfortable viewing by an operator, independent of the actual size of the stylus point 14 that is being measured. As best seen in FIG. 2, an image 32 of the stylus point 14 is shown having a shoe 34 and two adjacent keel shoulders 36. A portion of the stylus point 14 is illustrated in FIG. 3 showing the shoe 34 and the two keel shoulders 36.

The video signal from the camera 26 which is displayed on the TV monitor 30, is first directed to a video slicer 40 which displays a vertical sampling line 42 on the monitor. By manipulating certain controls associated with the video slicer 40, the operator can move the sampling line 42 over the image 32 of the stylus point 14 until the sampling line 42 is directly over the portion of the image whose length is to be measured. Since the images of the shoe 34 and keels 36 are the only bright objects in the field of view of the camera 26, when the sampling line 42 is positioned as shown in FIG. 2, the sampling line 42 traverses dark regions above and below the bright image of the shoe 34. The video slicer

40 detects these differences in brightness and generates a video signal 50 corresponding thereto. An image 38, being a graphical representation of the signal is displayed on the monitor 30 in a position horizontally in line with the image 32 as shown in FIG. 2. The amplitude of the image 38 represents the brightness along the sampling line 42 and the width W of the pulse, as shown in FIG. 2, represents the length L of the bright object, in this case the shoe 34. Similarly, the signal 50 includes a data pulse 52 having an amplitude representing the brightness of the object in the field of view of the camera 26 and a pulse width representing the length L of the bright object. The signal 50 further includes synchronizing pulses 54 for identifying each video frame.

This signal 50 is directed to a sampling and display circuit 58 which measures the width of the data pulse 52 by turning a counter on at the beginning of the pulse and turning it off at the end. A variable frequency pulse generator provides the oscillations that are counted as well as the means for calibrating the system so that the number of oscillations corresponds directly to the stylus shoe length L, see FIG. 3, in units of 0.1 micrometer. The number of oscillations counted is displayed on a digital display device that is commonly used in the art and is commercially available. A novel arrangement of the sampling and display circuit 58 is the subject of a copending application of Jacob Paul Hasili filed concurrently with the present application and entitled "Apparatus and Method for Measuring and Displaying the Pulse Width of a Video Signal" and having the attorney's docket number RCA 75,009. It will be understood, however, that the present invention will be operative and function well with a variety of sampling and display circuits that are well known in the art.

The video slicer 40 utilized in the present invention is commercially available from Hamamatsu Corporation as Model 147. This particular video slicer contains features and capabilities that are not utilized in the present invention and so are not described here. It is understood that other suitable video slicers may be used in the present invention and that with such devices there may be minor variations in its operational characteristics. Such variations, for example, may be in the orientation of the sampling line 42, that is, horizontal or at some other angle as opposed to vertical, as with the present device.

The novel and important feature of the present invention is the automatic measuring and displaying in fractions of a micrometer, the shoe length of a video disc stylus. The stylus is simply placed within the field of view of the microscope, the sampling line 42 is adjusted by the operator so that it passes directly through the center of the image of the shoe, and the length of the shoe is then automatically displayed.

What is claimed is:

1. Apparatus for automatically measuring the length of a body having microscopic dimensions comprising:
    (a) an optical microscope capable of being focused on said body and forming an optical image only thereof;
    (b) a video camera coupled to said microscope and arranged to form first video signals representative of said optical image;
    (c) video slicer means responsive to said first video signals for generating second video signals representative of the brightness of said optical image only along a particular sampling line; and
    (d) sampling and display means responsive to said second video signal for automatically determining a value representative of the length of said body along said sampling line and generating a third signal representative of said determined value in predetermined units of length.

2. The apparatus set forth in claim 1 including a television monitor arranged to display graphic representations of both said first and second video signals and a line representing said particular sampling line.

3. The apparatus set forth in claim 2 wherein said sampling line is generated by said video slicer means and is selectively positionable with respect to said graphic representation of said first video signal by an operator.

4. The apparatus set forth in claim 3 wherein said second video signal includes a data pulse having an amplitude representative of the relative brightness of said body and a width representative of the length of said body.

5. The apparatus set forth in claim 4 wherein said sampling and display means is arranged to measure said width of said data pulse and wherein said third signal representative of said determined value in predetermined units of length causes a digital display to display said determined value in tenths of a micrometer.

6. A method for automatically measuring the length of the shoe of a video disc stylus comprising:
    (a) placing the shoe of the stylus within the field of view of a microscope and generating an optical image of said shoe thereby;
    (b) generating a first video signal representative of said optical image;
    (c) generating a second video signal representative of the brightness of said optical image only along a particular sampling line;
    (d) measuring a component of said second video signal and determining a value representative of the length of said shoe; and
    (e) generating a third signal representative of said determined value in predetermined units of length.

7. The method set forth in claim 6 including positioning said particular sampling line with respect to said optical image of said shoe.

8. The method set forth in claim 7 wherein said measuring a component of said second video signal comprises measuring the width of selected pulses of said second signal.

9. The method set forth in claim 8 including operating a digital display and displaying said determined value represented by said third signal in tenths of a micrometer.

* * * * *